United States Patent [19]

Prueitt

[11] Patent Number: 5,395,598

[45] Date of Patent: Mar. 7, 1995

[54] CONVECTION TOWERS

[75] Inventor: Melvin L. Prueitt, Los Alamos, N. Mex.

[73] Assignee: The Regents of the University of California, Oakland, Calif.

[21] Appl. No.: 139,232

[22] Filed: Oct. 19, 1993

Related U.S. Application Data

[63] Continuation-in-part of Ser. No. 942,490, Sep. 9, 1992, Pat. No. 5,284,628.

[51] Int. Cl.⁶ .................. B01D 47/06; B01D 50/00; B01D 53/34; F03G 06/04
[52] U.S. Cl. ........................... 422/168; 55/222; 55/223; 60/641.9; 60/641.12; 261/116; 261/157; 261/DIG. 87
[58] Field of Search .................. 55/222, 223; 261/DIG. 11, DIG. 87, 116, 157; 423/215.5, 245.2; 422/168, 900; 60/641.8, 641.9, 641.11, 641.12, 641.13, 641.14

[56] References Cited

U.S. PATENT DOCUMENTS

| | | | |
|---|---|---|---|
| 3,214,348 | 10/1965 | Lichtenstein | 261/DIG. 11 X |
| 3,794,306 | 2/1974 | Engalitcheff, Jr. | 261/116 |
| 3,894,393 | 7/1975 | Carlson | 60/641.1 |
| 3,936,652 | 2/1976 | Levine | 261/DIG. 07 X |
| 4,016,725 | 4/1977 | Fiss | 261/DIG. 11 X |
| 4,149,901 | 4/1979 | Morales | 422/168 X |
| 4,235,607 | 11/1980 | Kinder et al. | 55/222 X |
| 4,275,309 | 6/1981 | Lucien | 60/641.12 X |
| 4,497,177 | 2/1985 | Anderson | 60/641.12 |
| 4,643,742 | 2/1987 | Hammarskog | 95/16 |
| 4,878,349 | 11/1989 | Czaja | 60/641.12 X |
| 5,017,351 | 5/1991 | Rafson | 423/245.2 |
| 5,072,553 | 12/1991 | Bozetto et al. | 52/63 |
| 5,103,742 | 4/1992 | Valentino | 110/215 |

FOREIGN PATENT DOCUMENTS

3014971A1 10/1981 Germany .
259242A1 8/1988 Germany .

Primary Examiner—Robert J. Warden
Assistant Examiner—L. M. Crawford
Attorney, Agent, or Firm—Milton D. Wyrick; William A. Eklund

[57] ABSTRACT

Convection towers which are capable of cleaning the pollution from large quantities of air, of generating electricity, and of producing fresh water utilize the evaporation of water sprayed into the towers to create strong airflows and to remove pollution from the air. Turbines in tunnels at the skirt section of the towers generate electricity, and condensers produce fresh water.

7 Claims, 5 Drawing Sheets

CONVECTION TOWERS

FIELD OF THE INVENTION

This is a continuation-in-part application out of U.S. patent application Ser. No. 07/942,490, filed Sep. 9, 1992, now U.S. Pat. No. 5,284,628.

The present invention generally relates to air pollution control, and, more particularly, to the large scale scrubbing of pollutants from air, of producing electricity, and of producing fresh water. The invention is a result of a contract with the Department of Energy (Contract No. W-7405-ENG-36).

BACKGROUND OF THE INVENTION

One of the great problems currently facing this country, and indeed the world, is that of air pollution. The emissions from pollution producing plants, homes, airplanes and automobiles produce potentially harmful air, particularly in and around large cities. Cleaning this air after it is in the atmosphere is a formidable task. Scrubbers on smoke stacks, unleaded gasoline, and carpooling plans seek to reduce the level of contamination, but do nothing towards cleaning the pollution that does reach the atmosphere.

Areas such as Los Angeles and Mexico City have pollution situations that can make the air unfit or even dangerous to breathe. Although substantial efforts have been made to assess the dangers of such pollution, and to find solutions, these efforts have not yielded a great deal of improvement. To solve these pollution problems, an efficient, large scale and economical system is needed.

The present invention does provide a means for cleansing pollution from the air, and accomplishes this through the use of convection towers. These towers are capable of economically removing particulate matter, and reducing the level of carbon dioxide and other gases. Various embodiments of the invention are also capable of producing electricity and large quantities of fresh water.

By way of example, the Los Angeles basin contains approximately 15,000 square kilometers of land, with most of the area's pollution being created in an area of only 3,000 square kilometers. The pollution depth below the inversion layer is normally approximately 500 meters, so it is only necessary to clean about 1,500 cubic kilometers of air every one or two days. Installations consisting of several of the present invention can accomplish this level of air cleaning.

Other researchers have proposed the use of filters for removing particulate matter from the air. However, because of the very large quantities of air that must be processed in large scale systems, the energy requirements to force the air through the filters would be enormous. Replacement and disposal of filters would be labor intensive and expensive. Additionally, the processed air would have about the same density as the dirty air, making it difficult to prevent immediate mixing of the two, unless suitable prevailing winds are present.

The present invention, although it requires substantial structure, accomplishes the cleaning of pollutants from the air using straightforward applications of natural forces. That is, water sprays precipitate out the pollutants, and the evaporation of the water creates strong winds through a chimney which pulls the air to be cleaned through the spray, and also can be used to drive turbines to produce electricity, and to produce fresh water, in areas where electrical power and fresh water are needed.

It is therefore an object of the present invention to provide apparatus capable of cleaning pollution products from large quantities of air.

It is another object of the present invention to provide apparatus which can, in addition to cleaning air, generate electricity, at least a part of which is used to pump water up to sprayers in a tower.

It is yet another object of the present invention to provide apparatus which can, in addition to cleaning air, can produce fresh water.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises a convection tower for cleaning polluted air and generating electrical power comprising a structure having a tower section and a skirt section, the skirt section being formed into individual tunnels, and one or more first water sprayer means disposed in the tower section for providing fine mist water droplets for evaporative cooling of air in the tower section of the structure to create a flow of the air through the structure and for removing pollution from the air. A plurality of turbine generator means are in the tunnels of the skirt section of the structure for generating electrical power from the flow of the air through the structure, and a plurality of second water sprayer means are disposed in the tunnels for removing any remaining pollutants and the fine mist water droplets from the flow of air through the structure.

In a further aspect of the present invention, and in accordance with its objects and purposes, apparatus for cleaning pollution from air, and providing fresh water comprises a structure having a first tower and a second tower connected by a conduit, the first tower being taller than said second tower, the second tower having a bottom and a top, and one or more first water sprayer means located in the first tower for providing fine mist water droplets for evaporative cooling of the air in the tower section of the structure to create a flow of the air through the structure and for removing pollution from the air. Turbine generator means are disposed in the conduit for generating electrical power from the flow of the air through the structure. Second water sprayer means are disposed in the conduit for removing any remaining pollutants and the fine mist water droplets from the flow of air through the structure, and third water sprayer means are disposed in the second tower for providing fresh water drops to collect mist particles that have condensed from the flow of the air through the structure. Fresh water collection means are located in the bottom of the second tower for collecting fresh water from the second tower.

In a still further aspect of the present invention, and in accordance with its objects and purposes, an updraft convection tower for cleaning polluted air, generating electrical power, and producing fresh water comprises a structure having a tower section with a top and a bottom, and a skirt section containing a plurality of individual tunnel sections. Solar heating means are located in the skirt section for preheating air in the plurality of individual tunnel sections and for helping to create a flow of said air through the structure. A plurality of first water sprayer means are disposed in the skirt section for removing pollution from the flow of air through the structure and for increasing relative humidity in the structure. A plurality of turbine motor/generator means are disposed in the plurality of individual tunnel sections for initiating the flow of air through the structure and for generating electrical power from the flow of the air through the structure. A second water sprayer means is located in the tower section for producing water drops which collect mist particles in the flow of the air through the structure.

In a still further aspect of the present invention, and in accordance with its objects and purposes, a convection tower for cleaning polluted air, generating electrical power, producing fresh water comprises a structure having a tower section and a skirt section, the skirt section being formed into a plurality of individual tunnels. One or more first water sprayer means are disposed in the tower section for providing fine mist water droplets for evaporative cooling of the air in the tower section of the structure to create a flow of air through the structure and for removing pollution from the air. A plurality of turbine generator means are located in the plurality of individual tunnels of the skirt section of the structure for generating electrical power from the flow of air through the structure. A plurality of second water sprayer means are disposed in the plurality of individual tunnels of the skirt section of the structure for removing any remaining pollutants and the fine mist water droplets from the flow of air through the structure. A plurality of condensing means are located downwind of the plurality of second water sprayer means for condensing fresh water out of the flow of air through the structure. Fresh water collection means are located below the plurality of condensing means for collecting the fresh water condensed from the flow of air through the structure by the condensing means.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
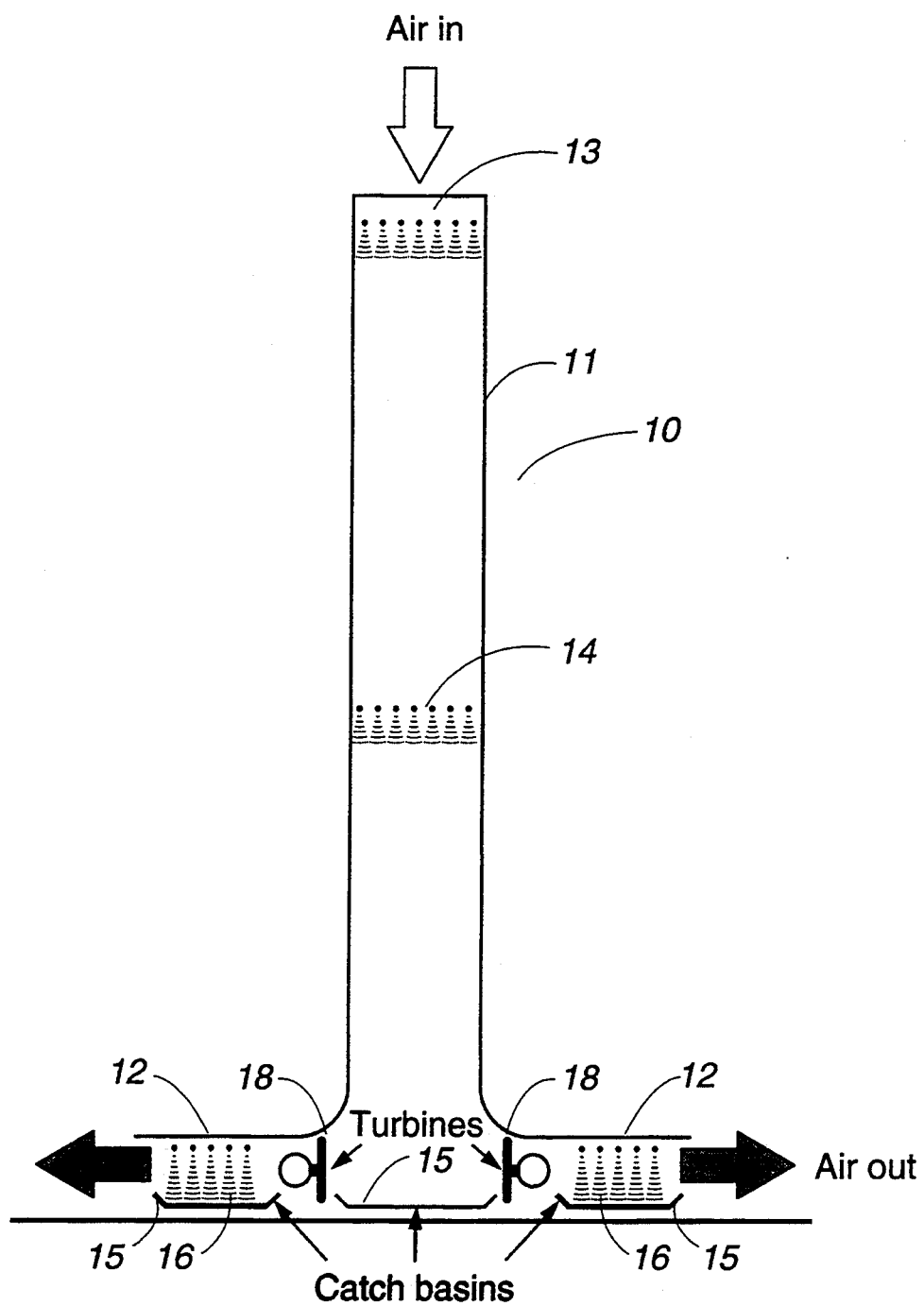
FIG. 1 is a schematical cross-sectional side view of the downdraft embodiment of the present invention.

One embodiment of the present invention is illustrated schematical cross-section in FIG. 1. Here, structure 10 comprises tower section 11 and skirt section 12, although actual designs for structure 10 can vary greatly. As seen, water sprayers 13, 14 in tower section 11 spray water, such as sea water or treated and chlorinated sewer water, down through tower section 11 in the form of fine mist water droplets. The air in tower section 11 is cooled by the evaporation of this water, and the water droplets simultaneously absorb pollutant materials in the air. As the air is cooled, it becomes more dense than the ambient air, and falls down through tower section 11. As it falls, the air compresses and increases in temperature, tending to lower the relative humidity in tower section 11. Water drops continue to evaporate, tending to keep the relative humidity near 100%.

Water drops which have not evaporated, and most particulates, are caught in catch basin 15, as the fast moving air is passed through turbine generators 18 in skirt section 12 to generate electrical power. Any particulates and fine mist water droplets from water sprayers 13, 14 which may have remained in the air flow are then removed by water sprayers 16 and collected in catch basins 15, so that the particulates are not blown out as another pollutant into the surrounding air. Additional sprayer banks spraying other chemicals that dissolve hydrocarbons and other gases could also be installed in skirt section 12.

The cleaned air which is output through skirt section 12 is cooler and more dense than the ambient air, so that it spreads out near the ground and displaces polluted air upward so that it will enter tower section 11 and be cleaned. A series of such towers around a city would create a cool, clean layer of air near the surface, where the city's population lives.

Figure 2:
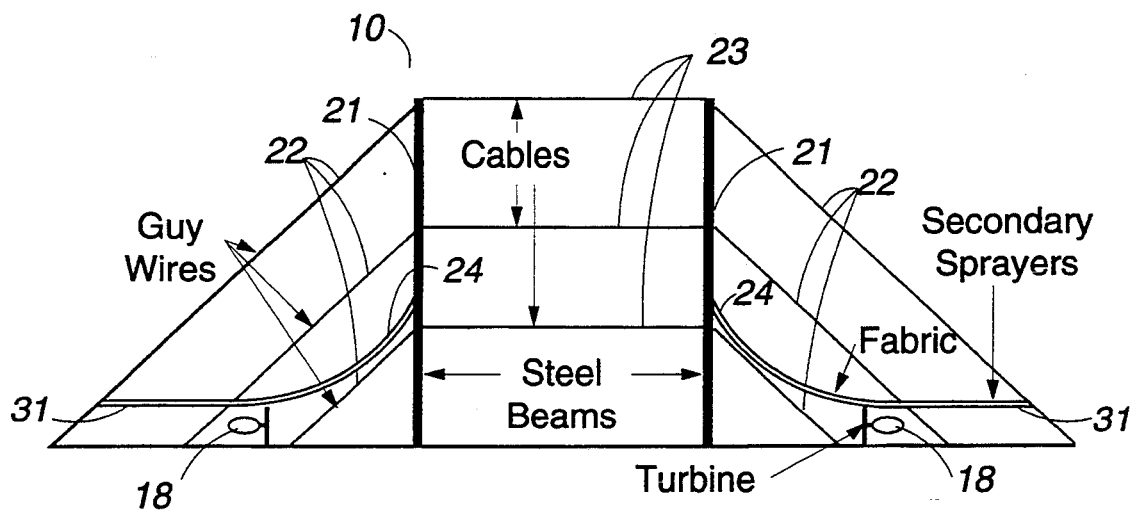
FIG. 2 is a schematical cross-sectional view of a tower construction method using beams together with guy wires and cables to support a fabric tower and skirt section.

In one embodiment, illustrated in a schematical cross-sectional view in FIG. 2, structure 10 can be constructed by placing about ten steel towers 21 around its circumference. Each steel tower 21 would be supported by guy wires 22 running radially outward. Other cables 23 run from each tower to the steel tower directly across, and fabric surface 24 of structure 10 is stretched between steel towers 21 and supported in skirt section 12 (FIG. 1) by cables 31. Fabric surface 24 needs to be light, but strong. One possible fabric is TEFLON ® coated fiberglass, which is fireproof, chemical resistant, and has a probable life of 40 years. Also shown in position are turbine generators 18.

Computer simulations for a structure 10 according to the present invention that has a height of 500 meters, and a radius of 200 meters, with an ambient temperature of 30° C., and relative humidity of 50%, have been run. They indicate that the difference in air density between the air inside tower section 11 and the ambient air would create a downward wind in tower section 11 having a velocity of 25 mph. A total of 121 cubic kilometers of air per day would be processed. Turbine generators 18 would be designed to extract 85 MW from the air stream. For this case, about 15,000 kg/sec of water would be required, and the pumping load would be in the area of 60 MW.

Generally, the rate of air flow through tower section 11 is determined by the ambient temperature and relative humidity. A temperature of 30° C. and relative humidity of 20% would result in a doubling of the power level obtained in the preceding simulation. Additionally, the flow rate is affected by the rate of flow of water through sprayers 13, 14, and 16.

Figure 3:
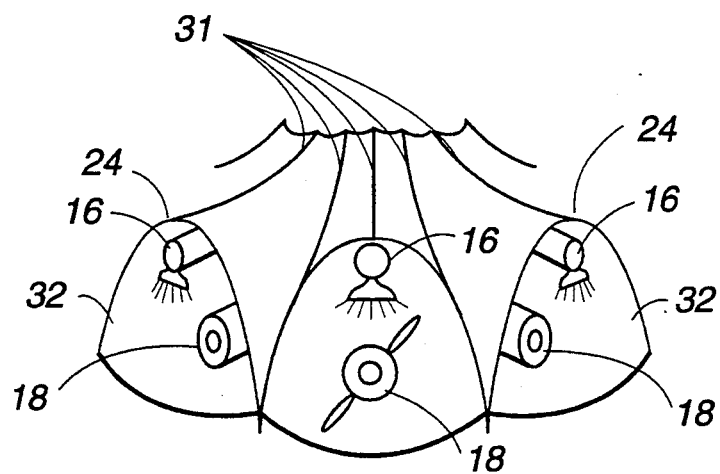
FIG. 3 is a partial side view of the skirt section of the embodiment of the invention illustrated in FIG. 1, showing the detail of the individual tunnels.

FIG. 3 is a partial side view of skirt section 12 illustrating the arrangement of fabric surface 24 to direct the air flow through turbine generators 18. Fabric surface 24 is stretched over cables 31 to form individual tunnels 32, each tunnel 32 containing a turbine 18 and sprayers 16. As air passes through tower section 11 (FIG. 1) it is directed into tunnels 32 and turns turbine generators 18.

This embodiment benefits from the fact that structure 10 with its skirt section 12 defines diffusers downstream from turbine generators 18. These diffusers result from the fact that the cross-sectional area in tunnels 32 increases downstream of turbine generators 18. By having diffusers downstream of turbine generators 18 in the airflow, the efficiency of turbine generators 18 is increased. The diffuser effect of this embodiment of the present invention can be enhanced by raising the top surface of skirt section 12 that lies beyond turbine generators 18. Enhancement of the diffuser effect would be possible if tunnels 32 opened directly into the total area under a flat skirt section 12. Diffusers, commonly used with gas turbine engines, can significantly increase air velocity and kinetic energy in the present embodiment.

Figure 4:
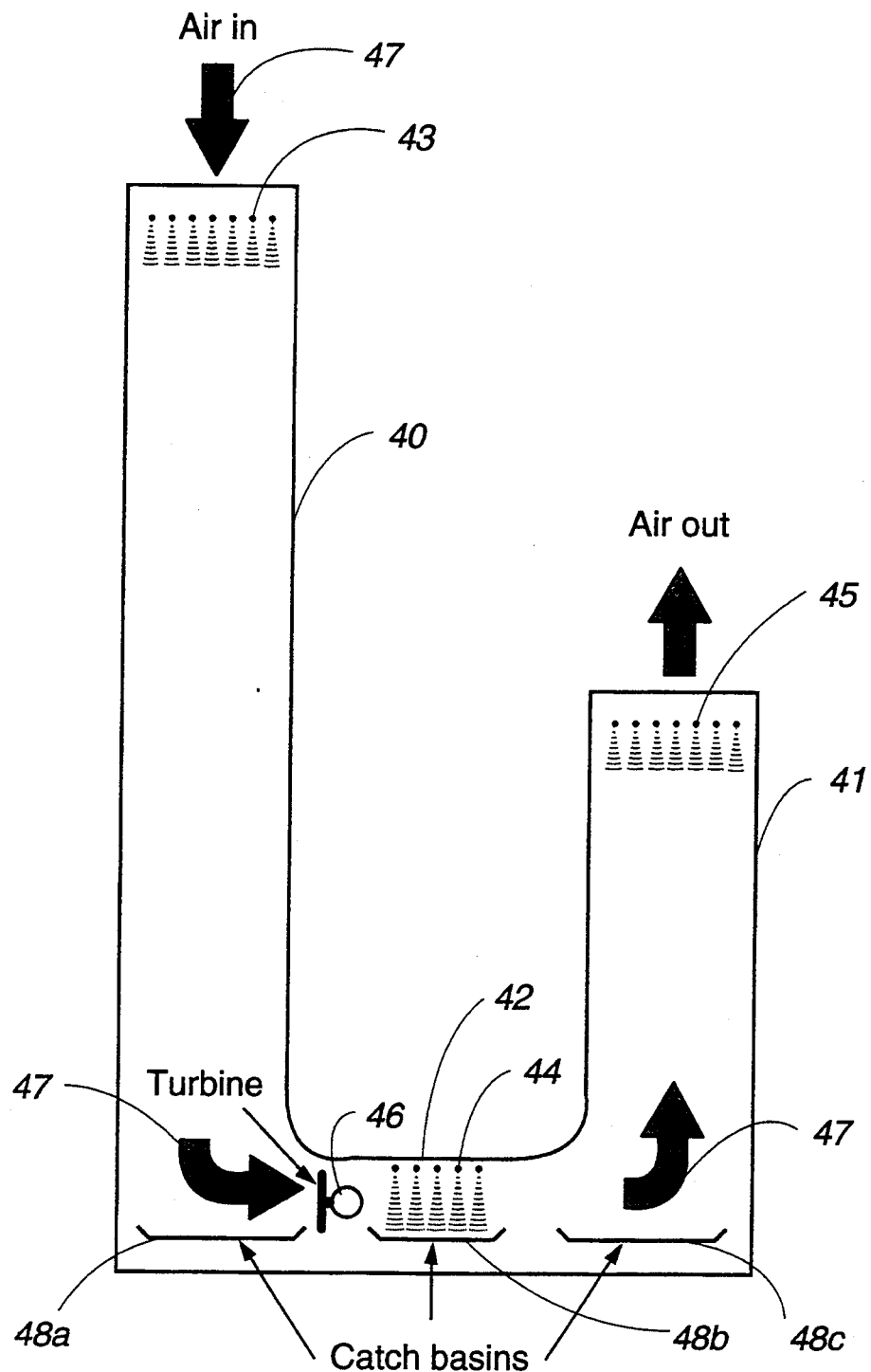
FIG. 4 is a schematical cross-sectional side view of the embodiment of the invention which, in addition to cleaning the air and generating electricity, produces fresh water.

Another embodiment is illustrated in FIG. 4, where a convection tower arrangement is illustrated which, in addition to cleaning polluted air and generating electricity, can produce fresh water. Referring to FIG. 4, there can be seen towers 40 and 41, connected together at their bottoms by conduit 42. Sprayers 43 are located at the top of tower 40 and sprayers 44 are located in conduit 42. Sprayers 43, 44 can spray either sea water, or treated and chlorinated sewer water in the form of fine mist water droplets for sprayers 43 and in large drops for sprayers 44. Sprayers 45 are located at the top of tower 41, which is shorter than tower 40. Sprayers 45 spray only fresh water.

As an alternative to the use of conduit 42, tower 41 could be made concentric with tower 40, with a larger diameter. A passage way for air is provided between the base of tower 40 and the base of tower 41.

In operation, sea water or treated and chlorinated sewer water is sprayed through sprayers 43 as in the previous embodiment, causing the cooled air to descend through tower 40 and generate power in turbine generators 46, as in the previous embodiment. However, here, airflow 47 is through turbine generators 46 and into tower 41 through conduit 42. The sea water or treated and chlorinated sewer water is collected in catch basin 48a. After passing through turbine generators 46, the air passes through another sea water or treated and chlorinated sewer water spray from sprayers 44 to remove most of any particulates and fine mist water droplets remaining the air at that point which are collected in catch basin 48b. As the air rises in tower 41, it cools, and becomes supersaturated with water vapor. The vapor condenses on remaining particulate matter.

Additional condensation forms as the air continues flowing upward in tower 41, but the mist particles are not sufficiently heavy to fall through the rising air. However, at the top of tower 41 sprayers 45 spray fresh water into the upward flowing air, and these water drops are sufficiently heavy to fall through the air, collecting mist particles as they fall. Fresh water is collected in catch basin 48c.

With tower 40 1000 meters tall and 200 Meters in radius, and tower 41 500 meters tall and with a 200 meters radius, and at a temperature of 30° C. and relative humidity of 50%, this embodiment could produce 22 million gallons of fresh water in 10 hours. The overall air cleaning and power production are similar to the previous embodiment. Instead of building towers, large inflated double-walled plastic tubes could be laid on the side of steep mountain slopes.

Figure 6:
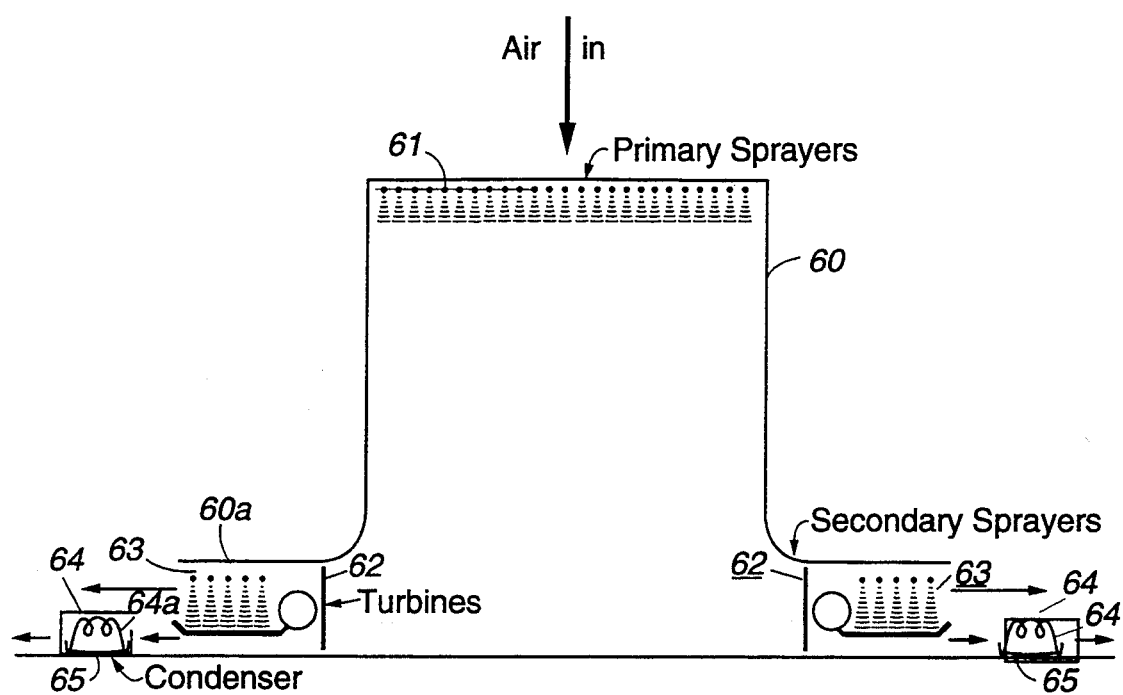
FIG. 6 is a schematical cross-sectional side view of the embodiment of the invention which can produce fresh water from condensation of the humid air exiting the tower.

Another embodiment of the invention capable of producing fresh water is illustrated in FIG. 6. This embodiment is of particular use in situations where the convection towers can be placed fairly close to large bodies of water, so that sea water can be employed. Here, tower 60 is shown having primary sprayers 61 arranged to spray sea water into tower 60. Skirt section 60a of tower 60 contains turbines 62, if electrical generation is desired, and secondary sprayers 63. Secondary sprayers are employed, as before, for removing pollutants from the air. For the purposes of this embodiment, condensing unit 64 is also located near the edge of skirt section 60a.

As the air exiting through skirt section 60a is very close to 100% relative humidity, its contact with a cooler surface will result in condensation. This is the purpose of condensing units 64, which are located downwind of secondary sprayers 63, and which contain pipes 64a through which cold sea water is circulated before being pumped to primary sprayers 61 at the top of tower 60. In operation, a portion of the air exiting tower 60 through skirt section 60a flows through condensing units 64, and much of the clean, fresh water is condensed onto pipes 64a and drips off into collection trays 65.

Calculations have shown that a tower 60 which is 180 meters high and has a diameter of 100 meters at its top, in which the incoming sea water is heated by 10 degrees C. by the condensation of water vapor in condensing units 64, could produce 200,000 kg of fresh water per hour. That production rate would result in a half million gallons of water per ten hour day.

As stated above, the sea water pumped through tower 60 is relatively cold. Even colder sea water could be obtained if it is taken from deep below the surface. The temperature of sea water at a depth of 1000 meters is generally less than 10 degrees C., and at a depth of 2000 meters is generally less than 4 degrees C.

Figure 5:
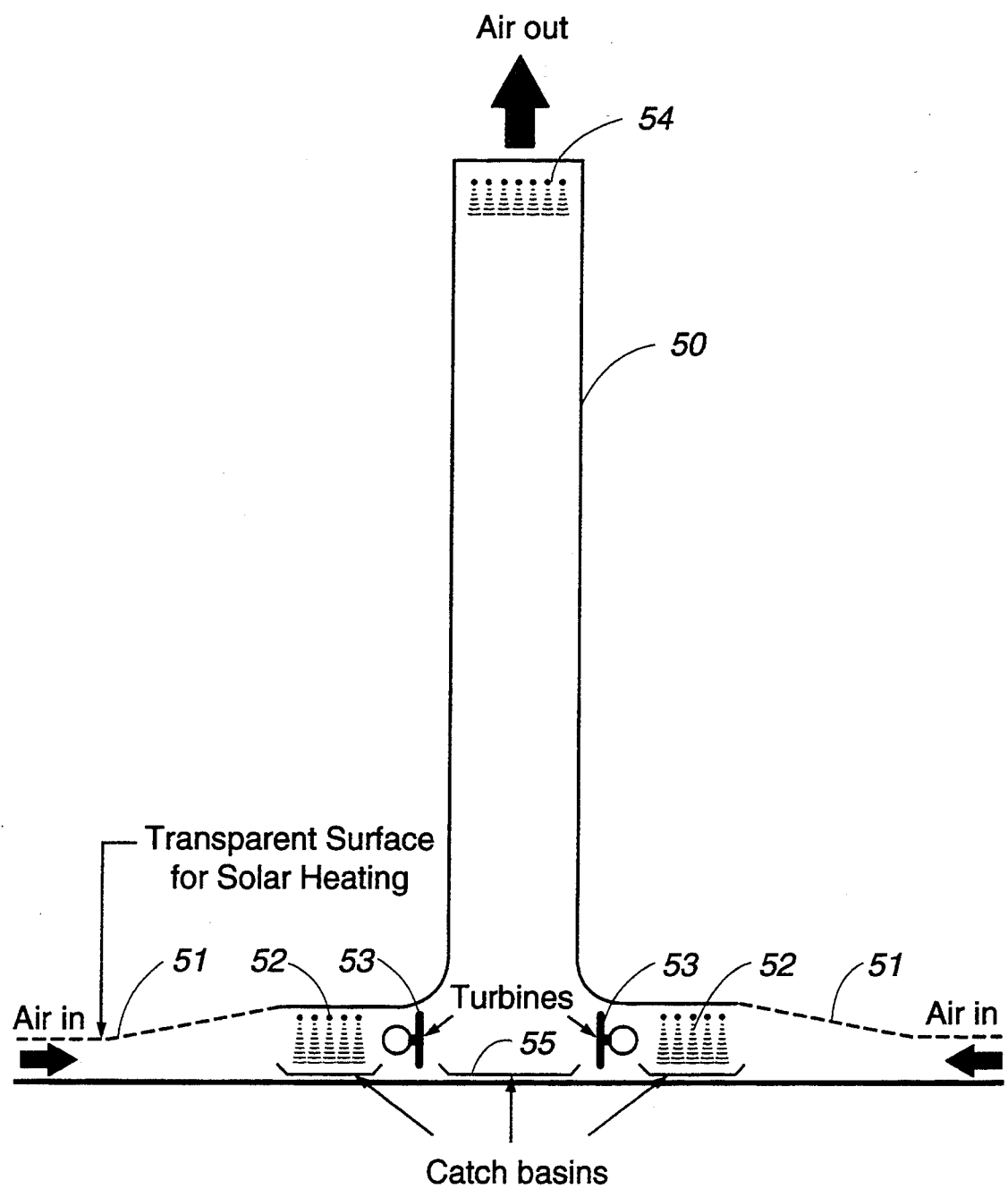
FIG. 5 is a schematical cross-sectional side view of the embodiment of the invention which can operate in an updraft mode.

Another embodiment of the present invention is illustrated in FIG. 5. This embodiment is intended for areas of relatively high humidity, and is intended to operate in an updraft mode, similar to the processes in cumulonimbus clouds. As seen, in this case, air enters at the bottom of tower 50 through skirt section 51, the flow of air being initiated by turbine motor/generators 53 operating in the motor mode to pull in the air. A portion of skirt section 51 can be made of transparent plastic in order to trap available solar energy and help with the air flow. As the air near the ground is already heated by the sun, the effective area of skirt section 51 is larger than the actual diameter of skirt section 51.

Once the air flow is established, the heated air flows through skirt section 51 and through a spray of sea water or treated and chlorinated sewer water from sprayers 52 where the pollution is removed, and then through turbine motor/generators 53, now operating as generators, for power production. The air is at nearly 100% relative humidity as it enters tower 50 and cools as it rises, the water vapor condensing into a fog. However, this condensation releases heat which causes the air to expand, making it less dense than the air outside tower 50, and providing the buoyant force that drives the column of air upward.

At the top of tower 50, sprayers 54 spray fresh water which collects the mist particles. The fresh water is collected in catch basin 55. Demisters could be used instead of water sprayers at the top of tower 50.

Tower 50 needs to be taller than tower 11 of FIG. 1. Computer simulations indicate that a tower 50 having a height of 2000 meters and 200 meters radius at a temperature of 30° C. and 90% relative humidity could process 4 cu. km. of air per hour, and produce 20 MW of electrical power and fresh water. Preheating the air increases the efficiency of this embodiment, as does higher humidity. As with the last embodiment, large inflated double-wall plastic tubes could be placed on steep mountain slopes, obviating the need for towers.

It will be recognized by those with skill in this art that, although salt water and treated and chlorinated sewer water have been suggested for use in certain sprayers, any available and economical water may be used. Also, it should be understood that, when advantageous to do so, chemicals which are effective to dissolve hydrocarbons and other gases could be sprayed into the airstream. In the cases where fresh water is specified, it must be used to attain the full attributes of the various embodiments.

The foregoing description of the embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An updraft convection tower for cleaning polluted air, generating electrical power, and producing fresh water comprising:

a structure defining a tower section having a top and a bottom, and a skirt section connected to and below said bottom section containing a plurality of individual tunnel sections;

solar heating means in said skirt section for preheating air in said plurality of individual tunnel sections and for helping to create a flow of said air through said structure;

a plurality of first water sprayer means disposed in said skirt section for removing pollution from said flow of air through said structure and for increasing relative humidity in said structure;

a plurality of turbine motor/generator means disposed in said plurality of individual tunnel sections for initiating said flow of air through said structure and for generating electrical power once said flow of said air through said structure is established; and a second water sprayer means located in said tower section for producing water drops which collect mist particles in said flow of said air through said structure.

2. The updraft convection tower described in claim 1 wherein said plurality of first water sprayer means spray sea water.

3. The updraft convection tower described in claim 1 wherein said plurality of first water sprayer means spray treated and chlorinated sewer water.

4. The updraft convection tower described in claim 1 further comprising chemical sprayer means for spraying chemicals effective to dissolve hydrocarbons and other gases from said flow of air through said structure.

5. The updraft convection tower described in claim 1 wherein said second water sprayer means spray fresh water.

6. The updraft convection tower described in claim 1 further comprising a plurality of first catch basin means located in said individual tunnel sections under said plurality of first water sprayer means for collecting pollution particulates from said flow of said air through said structure.

7. The updraft convection tower described in claim 6 further comprising second catch basin means located in said bottom of said tower section for collecting said mist particles and said fresh water.

* * * * *